US012682259B2

(12) United States Patent
Kapoor et al.

(10) Patent No.: US 12,682,259 B2
(45) Date of Patent: Jul. 14, 2026

(54) METHODS FOR COMPRESSING A NEURAL NETWORK

(71) Applicant: Volkswagen Aktiengesellschaft, Wolfsburg (DE)

(72) Inventors: Nikhil Kapoor, Wolfsburg (DE); Peter Schlicht, Wolfsburg (DE); John Serin Varghese, Braunschweig (DE); Jan David Schneider, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 1046 days.

(21) Appl. No.: 17/639,713

(22) PCT Filed: Aug. 4, 2020

(86) PCT No.: PCT/EP2020/071872
§ 371 (c)(1),
(2) Date: Mar. 2, 2022

(87) PCT Pub. No.: WO2021/043517
PCT Pub. Date: Mar. 11, 2021

(65) Prior Publication Data
US 2022/0292376 A1 Sep. 15, 2022

(30) Foreign Application Priority Data
Sep. 4, 2019 (DE) ..................... 10 2019 213 459.9

(51) Int. Cl.
*G06N 5/04* (2023.01)
*G06N 3/063* (2023.01)

(52) U.S. Cl.
CPC .............. *G06N 5/04* (2013.01); *G06N 3/063* (2013.01)

(58) Field of Classification Search
CPC ................................. G06N 5/04; G06N 3/063
See application file for complete search history.

(56) References Cited

U.S. PATENT DOCUMENTS

2018/0075341 A1    3/2018    Dasgupta et al.
2018/0114114 A1    4/2018    Molchanov et al.
(Continued)

FOREIGN PATENT DOCUMENTS

CN    107169527 A    9/2017    ............... G06K 9/62
CN    109726811 A    5/2019    ............... G06N 3/04
(Continued)

OTHER PUBLICATIONS

NPL: Shi, Wenqi, et al. "Improving device-edge cooperative inference of deep learning via 2-step pruning" (Mar. 2019). (Year: 2019).*
(Continued)

*Primary Examiner* — Li B. Zhen
*Assistant Examiner* — Sadik A Alshahari
(74) *Attorney, Agent, or Firm* — Slayden Grubert Beard PLLC

(57) ABSTRACT

The disclosure relates to methods for compressing a neural network, wherein members of a vehicle fleet locally execute the neural network and during at least one inference phase each determine a selection of elements of the neural network that should be pruned, wherein the members of the fleet transmit the respective determined selection to a central server, wherein the central server merges the respective transmitted selections and generates a merged selection, and wherein the central server prunes the neural network on the basis of the merged selection.

8 Claims, 2 Drawing Sheets

(56)    References Cited

U.S. PATENT DOCUMENTS

| | | | | |
|---|---|---|---|---|
| 2018/0121791 | A1* | 5/2018 | O'Connor | G06N 3/049 |
| 2018/0336468 | A1 | 11/2018 | Kadav et al. | |
| 2019/0057308 | A1 | 2/2019 | Cho et al. | |
| 2019/0061147 | A1 | 2/2019 | Luciw | |
| 2019/0114543 | A1* | 4/2019 | Chen | G06N 3/08 |
| 2019/0130267 | A1 | 5/2019 | Norouzi et al. | |
| 2019/0311298 | A1* | 10/2019 | Kopp | G01C 25/00 |
| 2019/0362235 | A1* | 11/2019 | Xu | G06N 3/04 |
| 2020/0074282 | A1* | 3/2020 | Beaudoin | G06F 17/16 |
| 2020/0364572 | A1* | 11/2020 | Senn | G06N 3/045 |
| 2022/0114455 | A1* | 4/2022 | Samek | G06N 3/084 |

FOREIGN PATENT DOCUMENTS

| | | | | |
|---|---|---|---|---|
| DE | 102019213459 | A1 | 3/2021 | G06N 3/02 |
| WO | 2018/218149 | A1 | 11/2018 | G01C 21/32 |
| WO | 2019/033380 | A1 | 2/2019 | G06N 3/08 |
| WO | 2021/043517 | A1 | 3/2021 | G06N 3/04 |

OTHER PUBLICATIONS

European Office Action, Application No. 20751522.2, 5 pages, Apr. 6, 2023.

Singh, Pravendra et al., "Stability Based Filter Pruning for Accelerating Deep CNNs," IEEE Winter Conference on Applications of Computer Vision (WACV), https://ieeexplore.ieee.org/document/86599189, pp. 1166-1174, Mar. 7, 2019.

Anirudh, V.K., "What is Neural Network Pruning and Why is it Important Today?" In analyticsindiamag.com, URL: https://analyticsindiamag.com/what-is-neural-network-pruning-and-why-is-it-important-today, 4 pages, Apr. 4, 2019.

Zhang, Jun et al., "Mobile Edge Intelligence and Computing for the Internet of Vehicles," Proceedings of IEEE, URL: https://arvix.org/pdf.1906.00400.pdf, pp. 246-261, Jun. 2, 2019.

"Federated Learning," Wikipedia.org, URL: https://www.wikipedia.org/w/index.php?title=Federated_Learning&oldid=912955488, 8 pages, Jun. 19, 2020.

Molchanov, Pavlo et al., "Pruning Convolutional Neural Networks for Resource Efficient Inference," arXiv Imprint, URL: http://arxiv.org/abs/1611.06440v2, 17 pages, Aug. 19, 2020.

German Office Action, Application No. 102019213459.9, 8 pages, Sep. 21, 2020.

International Search Report and Written Opinion, Application No. PCT/EP2020/071872, 7 pages, Nov. 13, 2020.

Chinese Office Action, Application No. 202080062080.7, 7 pages, Jul. 24, 2024.

* cited by examiner

METHODS FOR COMPRESSING A NEURAL NETWORK

CROSS-REFERENCE TO RELATED APPLICATIONS

This application claims priority to German Patent Application No. DE 10 2019 213 459.9, filed on Sep. 4, 2019 with the German Patent and Trademark Office. The contents of the aforesaid Patent Application are incorporated herein for all purposes.

TECHNICAL FIELD

The invention relates to a method for compressing a neural network. The invention also relates to a member of a fleet, a central server, and a system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern driver assistance systems and driving functions for automated driving are increasingly using machine learning in order, among other things, to detect the vehicle surroundings, including other road users (e.g., pedestrians and other vehicles) and to describe their behavior. In the process, input data (input) from various sources (e.g., cameras, radar, lidar) are evaluated by means of deep neural networks, which, among other things, classify said data pixel by pixel (semantic segmentation) or generate bounding boxes of detected objects.

In both cases, convolutional neural networks (CNN) are typically used, which parameterize the weights of so-called filters based on the input during training. The convolutional neural networks used are increasingly drawing on a large number of filters and layers, thus increasing the required time expenditure and computing effort for processing (inferring) input data into output data (output). Since the application of neural networks in the field of automatic driving is subject to severe restrictions with regard to a required computing time on account of the dynamic environment and since the hardware (computing capacities) that may be used in vehicles cannot be scaled arbitrarily, the size of the neural network is a limiting factor with regard to the possible uses in such systems.

So-called pruning attempts to reduce the size of the neural network by removing individual elements, i.e. neurons, parameters, or entire filters. In this connection, the choice of neurons or filters to be removed is important. Different filters may influence the output of the network to different extents. As such, selected strategies are used to select the filters which would have the least impact on the output (quality) if removed and, at the same time, to prune as large a quantity of filters as possible in order to significantly reduce the size of the network and thus to achieve inference and training times that are as short as possible.

SUMMARY

A need exists to improve a method for compressing a neural network, in particular with regard to a selection of elements of the neural network to be pruned.

The need is addressed by a method, a member of a fleet, a central server, and a system. Embodiments of the invention are described in the dependent claims, the following description, and the drawings.

DESCRIPTION

Figure 1:
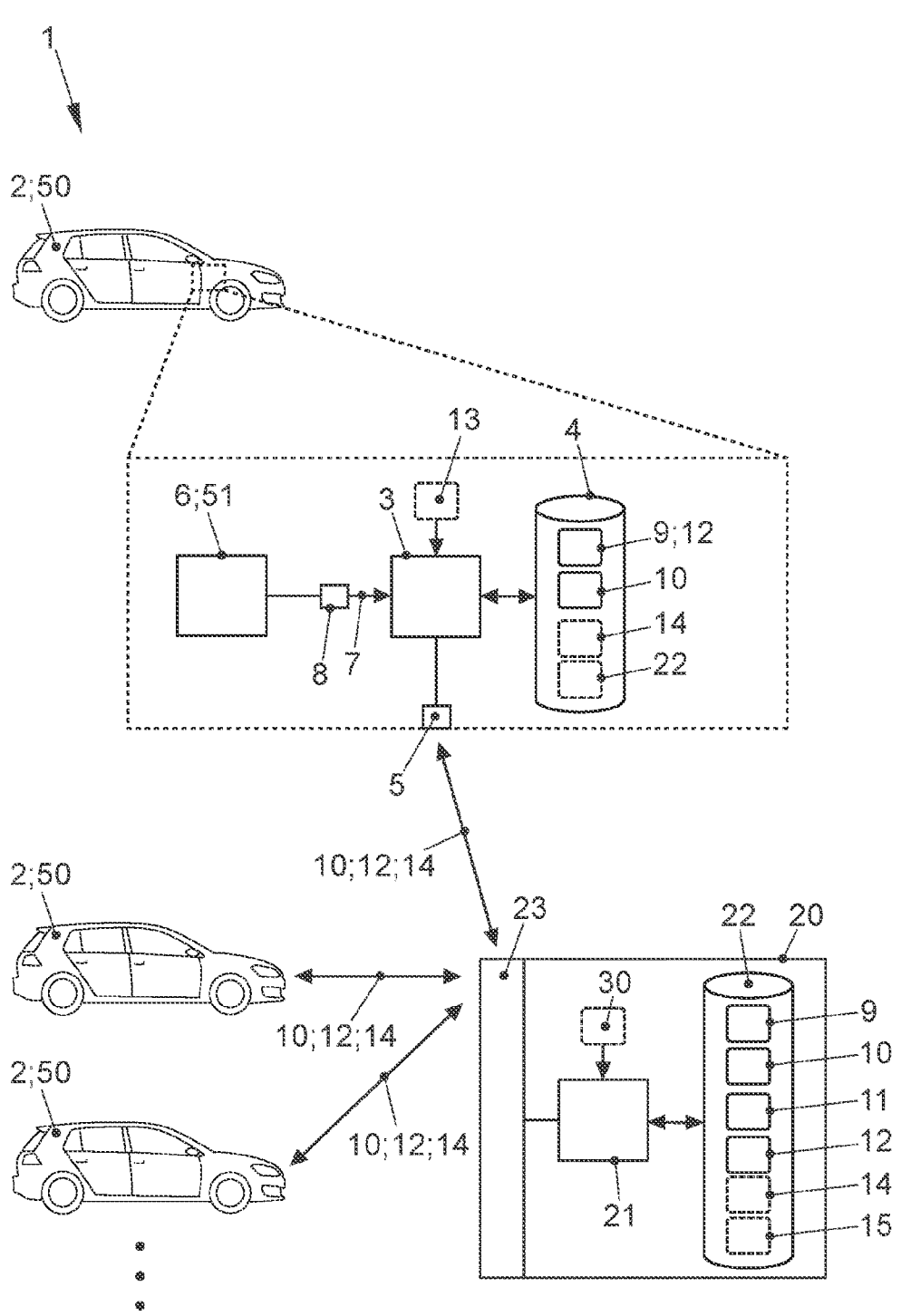
FIG. 1 is a schematic representation of an embodiment of a system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for compressing a neural network is in particular provided, wherein members of a vehicle fleet locally execute the neural network and during at least one inference phase each determine a selection of elements of the neural network that should be pruned, wherein the members of the fleet transmit the respective determined selection to a central server, wherein the central server merges the respective transmitted selections and generates a merged selection, and wherein the central server prunes the neural network on the basis of the merged selection.

In a second exemplary aspect, a member is in particular provided for a vehicle fleet, comprising a computing apparatus, wherein the computing apparatus is designed to locally execute a neural network and during at least one inference phase each determine a selection of elements of the neural network that should be pruned, and to transmit the determined selection to a central server.

In a third exemplary aspect, a central server is in particular provided, comprising a computing apparatus, wherein the computing apparatus is designed to merge selections of elements of a neural network transmitted by respective members of a fleet and generate a merged selection, and to prune the neural network on the basis of the merged selection.

In a fourth exemplary aspect, a system is in particular provided, comprising at least one member of a fleet according to the second aspect and a central server according to the third aspect. The system in particular carries out the method according to the first aspect.

The method and the system make it possible to compress a neural network in an efficient manner. This is achieved by drawing on members of a vehicle fleet. The members of the fleet execute the neural network by means of a computing apparatus. During at least one inference phase, elements of the neural network that should be pruned are determined. The determined elements are transmitted to a central server in each case in the form of a selection. The central server collects the respective selections of the members of the fleet and generates a merged selection therefrom. Subsequently, the neural network is pruned on the basis of the merged selection, in particular by means of the central server.

A benefit is that the selection of elements to be pruned takes place on the basis of a larger database, since a large number of members of a fleet select elements of the neural network taking into account different situations. The more members of a fleet are taken into account during determination of the selection of the elements of the neural network to be pruned, the more situations may be taken into account. As a result, the selection of the elements to be pruned is improved.

The computing apparatuses of the members of the fleet each comprise, in particular, a memory apparatus or may each access a memory apparatus of this kind. The computing apparatuses may be designed as a combination of hardware and software, for example as program code which is executed on a microcontroller or microprocessor. The computing apparatuses in particular operate the neural network, that is to say, the computing apparatuses execute the computing operations required for operating the neural network on provided input data, such that activations or values may be inferred and provided at outputs of the neural network in the form of output data. Local copies of the neural network, i.e., a structure and associated weightings as well as parameters of the neural network, are stored in each case in respectively associated memory apparatuses.

The computing apparatus of the central server is designed accordingly. A central copy of the neural network is present in the memory apparatus of the central server. The pruning is carried out on the central copy of the neural network.

Input data are, in particular, sensor data, in particular a sensor data stream of sensor data detected over time. In particular, the sensor data are detected by sensors and fed to an input layer of the neural network, for example via an input interface designed for this purpose. A sensor is, in particular, a camera, a lidar sensor, or a radar sensor. However, in principle, fused sensor data may also be used.

A member of a fleet is, in particular, a motor vehicle. However, in principle, a member of a fleet may also be any other land, water, air, or space vehicle.

The transmission of the selections from the members of the fleet to the central server takes place, in particular, via communication interfaces of the members of the fleet and of the central server provided for this purpose. Communication in particular takes place wirelessly.

The neural network is, in particular, a deep neural network, in particular a convolutional neural network (CNN). In particular, the neural network performs a perception function. For example, the neural network may serve to carry out object classification on detected sensor data, for example camera data. Furthermore, regions of the sensor data in which objects are to be found may also be identified (bounding box).

An element is, in particular, a neuron of the neural network. If the neural network is a convolutional neural network, an element is, in particular, a filter of the convolutional neural network.

"Pruning" of the neural network is in particular intended to mean that the structure of the neural network is modified, in particular trimmed or reduced in size. This is done by removing elements and/or parts (e.g., parameters or input channels, etc.) of the elements from the neural network. On account of the modified, in particular trimmed, structure, the pruned neural network may be applied to input data using a lower computing power. The structure of the pruned neural network is then compressed.

In particular, the method may be repeated cyclically. The method may, for example, be repeated until a termination criterion is met. The termination criterion may, for example, be a fall below a functional quality of the (progressively) pruned neural network.

In particular, the pruned neural network may be retrained after pruning in order to restore a functional quality (performance) of the (pruned) neural network after pruning.

During pruning, the neural network is in particular pruned in a homogeneous manner. "Homogeneous" should in this case be understood to mean that all regions of the neural network are on average pruned to the same extent. This may prevent regions or individual layers of the neural network being pruned excessively and thus prevent a functionality or a functional quality of the neural network from being adversely affected.

The elements of the neural network may be selected in a variety of ways. In a simple embodiment, for example, the elements of the neural network that have the least influence on an output result of the neural network are selected for pruning by the members of the fleet. Furthermore, elements at the outputs of which activations are always below a predefined threshold value may also be selected.

The selected elements are collected, for example, in the form of a list, a table, or a database and compiled into the selection.

For example, a unique identifier of a respective selected element is indicated in the list, table, or database, as are other properties or values, if applicable, for example a maximum, minimum, and/or average activation of the element in question. In particular, the list, the table, or the database comprises a respective selection criterion used or a value of the respective element associated with the respective selection criterion used. The selection criterion defines the conditions in which the elements are selected. The list, the table, or the database is transmitted to the central server via the communication interfaces in the form of a digital data packet, in particular.

The lists/rankings/tables may be merged in a variety of ways. In particular, average values may be formed and/or other averaging methods may be used, for example arithmetic average values, geometric average values, moment-based averaging methods, swarm-based averaging methods, geographic averaging methods depending on a travel distance of the member(s) of the fleet, and/or safety-focused or situation-dependent averaging methods.

In particular, the merging may comprise the determination of the elements most frequently selected by the members of the fleet, wherein the merged selection comprises the most frequently selected elements.

The pruned neural network may be output after pruning, for example in the form of a digital data set that describes the structure and the weightings or parameters of the neural network.

It may be provided that only selected members of the fleet of vehicles may carry out the method. Meanwhile, other members of the fleet may merely apply the neural network and obtain the pruned neural network from the central server after the neural network has been pruned, for example. However, a selection of elements to be pruned is not made or transmitted by the other members of the fleet. This has the benefit that the selected members of the fleet may be technically better equipped to carry out the method, for example with regard to a sensor system and/or a storage capacity of a memory apparatus.

In some embodiments, the selection is transmitted to the central server if at least one transmission criterion is met. As a result, any unnecessary communication between the members of the fleet and the central server may be prevented. A transmission criterion may, for example, be a specific number of locally collected elements of the neural network. A transmission criterion may also require that a selection no longer change after multiple runs or inference phases.

In some embodiments, the members of the fleet each produce a ranking of the selected elements and the selection is transmitted to the central server in the form of the produced ranking, wherein the central server produces a merged ranking on the basis of the transmitted rankings in order to carry out the merging, and wherein the neural network is pruned on the basis of the merged ranking. As a result, elements which attain the highest values according to a criterion according to which the ranking was produced may be pruned in a targeted manner.

In some embodiments, the neural network is fed input data that vary with time in order to determine the respective selection in each case, wherein temporal activation differences of elements of the neural network are determined for temporally adjacent input data, and wherein the elements of the neural network are selected depending on the determined temporal activation differences. This makes it possible to compress the neural network taking into account a stability-oriented criterion. This takes place in that the neural network is fed input data that vary with time. Due to the temporal variation of the input data, the activations or values at respective outputs of the individual elements of the neural network also change. A temporal variation of the activations or values at the outputs is then mapped via temporal activation differences of the elements of the neural network. This embodiment is based on the following idea: Since the input data, which are provided in particular on the basis of detected sensor data, generally only vary slightly with a small change in time, the activation differences that are determined for said change in time at the outputs of the elements should also vary only slightly. Large activation differences therefore point to unstable elements in the neural network. These unstable elements may be identified by determining the temporal activation differences. If the unstable elements are identified, they may later be removed centrally from the structure of the neural network by means of pruning in the central server.

An activation difference is, in particular, a difference that is determined from activations or values of an output that are inferred or calculated by an element of the neural network at adjacent, in particular successive, points in time. If the input data are, for example, camera data, the input data may correspond with two temporally successive individual images of the camera data. Therefore, a temporal fluctuation of the activations at the output of an element of the neural element is mapped via the activation difference depending on input data that vary with time.

Input data are, in particular, sensor data, in particular a sensor data stream of sensor data detected over time. In particular, the sensor data are detected by sensors and fed to an input layer of the neural network, for example via an input interface designed for this purpose.

If the neural network is a convolutional neural network, the activation differences are determined for each of the filters of the convolutional neural network.

If the method is repeated cyclically, the repetition of the method may for example be discontinued if the activation differences are below a predefined threshold value, i.e., if a predefined degree of stability is achieved.

In particular, average values may be formed element by element from the determined activation differences, wherein the pruning is carried out depending on the average values formed. As a result, brief peaks in the activation differences may be taken into account or mitigated. Peaks of this kind, in isolation, do not result in the associated element of the neural network being identified as unstable. The associated element is only selected for pruning if an average value of multiple activation differences determined for said element exceeds a threshold value, for example. The average values may be determined as an arithmetic average, temporal average, or geometric average. The average values may be formed by the members of the fleet and by the central server.

The merging of the selections in the central server, which may also be referred to as aggregation/amalgamation, may in particular comprise the formation of an arithmetic average value, geometric averaging methods (e.g., centroids of vectors formed from individual rankings may be formed), moment-based averaging methods, swarm-based averaging methods, geographic averaging methods, and/or safety-focused averaging methods.

Swarm-based averaging methods may, in particular, be designed as partial filters, i.e., subsets are selected from the selections of the individual members of the fleet and averaging takes place in each case only within these subsets. The subsets may, for example, be formed depending on a geographic position or region, a travel distance, a point in time (time, time of day, day of the week, month, season, etc.) or other properties. The subsets are always formed on the basis of commonalities of the members of the fleet providing the selections or the circumstances in which the selections were made.

Safety-focused averaging methods in particular take into account a situation in which an element of the neural network was selected for pruning. This situation may then influence the determined rankings. For example, safety-critical situations (e.g., if small children are in the vicinity of a motor vehicle) may result in selected elements being shifted higher in the ranking, i.e., toward the higher ranks. In particular, if a temporal activation difference is used to select the elements, a "penalty" for an element or filter may be increased (or decreased), such that situational circumstances have an effect on the ranking.

In some embodiments, at least some of the determined activation differences are determined depending on at least one influencing parameter. This makes it possible, for example, to influence the activation differences in terms of their temporal progression or in a situation-dependent manner. For example, a speed (provided, e.g., by a GPS sensor), current weather (provided, e.g., by a rain sensor), and/or a steering angle (provided, e.g., by a steering angle sensor) may be used to amplify or attenuate a determined activation difference depending on the situation. In particular, situational sensor properties may be taken into account as a result.

In some embodiments, the ranking of the elements is produced on the basis of the determined temporal activation differences, wherein the pruning is carried out depending on the ranking produced. In particular, the ranking is produced on the basis of respective average values of the determined activation differences. Proceeding from the produced ranking, it is possible, for example, for a predefined number of ranks to later be taken into account during pruning in the central server, for example the 10, 100, or 1000 elements of the neural network (e.g., the 10, 100, or 1000 filters of the convolutional neural network) that have the largest (averaged) activation differences. By producing the ranking, the neural network may be compressed and the most unstable elements may be selected and pruned in a targeted manner.

The rankings produced by the members of the fleet and transmitted to the central server as a respective selection are merged into a merged ranking by the central server.

In some embodiments, the ranking is in particular determined such that the elements of the neural network with the largest temporal activation differences are pruned. As a result, the most unstable elements of the neural network are removed from the neural network.

A ranking function for determining an (in)stability of an element of the neural network may be defined in a simple case by means of a temporal activation difference between activations of the element with respect to a (temporal) change in the input data (e.g., a change in temporally adjacent video frames).

If the input data are video frames, for example camera images of an environment camera, the structural similarity index measure (SSIM) may be used in a ranking function for the video frames of different points in time in order to determine a difference between temporally adjacent video frames.

In the case of a convolutional neural network (CNN), in an embodiment of the ranking function for a relevant filter (also referred to as filter kernel) in a convolutional layer of the CNN, the temporal activation differences in a preceding convolutional layer of the neural network are additionally taken into account. As a result, an influence of a preceding convolutional layer may be taken into account or eliminated during determination or calculation of the temporal activation differences. An idea behind this is that activation differences may propagate across the neural network, since the temporal activation differences of a convolutional layer are passed on to the following convolutional layer. By taking into account the temporal activation differences of the respective preceding convolutional layer, the activation differences calculated for individual filters are made comparable across the entire neural network or across layers. The ranking of the elements of the neural network may be determined better as a result.

In some embodiments, averaging may take place over multiple time increments. Furthermore, averaging may take place over, for example, multiple sets of input data, e.g., multiple video sequences each consisting of video frames.

In some embodiments, the merged ranking is produced taking into account at least one target variable. As a result, an extended ranking may be generated. In particular, by taking into account the at least one target variable, other targets may be taken into account in addition to the stability of the neural network. These targets may, for example, relate to a robustness of the neural network. If the neural network is used, for example, to recognize objects in camera data, a robustness to changes in brightness may be set as a target variable. In this connection, when selecting the temporal variance over the input data, it is ensured that said temporal variance merely manifests as a variance of the at least one target variable. The ranking is then produced analogously. Moreover, filters that have a greater influence within the neural network may be retained in spite of a large activation difference. Furthermore, filters that resemble a functionality according to other filters (e.g., filters that filter camera data by way of a convolution with a filter function) may be shifted to ranks higher up, i.e., they may take preference during pruning or removal. Conversely, filters that do not resemble other filters may be shifted to ranks lower down, i.e., less preferentially pruned. Other target variables may be plurality-oriented, i.e., ensure that many different features are recognized or filtered out in the input data. Accordingly, a determined ranking may be adapted in such a way that many different features or a minimum number of different features may still be recognized or filtered out. Another target variable may also be a performance of the neural network. Put simply, the merged ranking may be determined and/or adapted such that all intended target variables are taken into account during selection of the elements or filters of the neural network to be pruned.

In some embodiments, the determination of the selections, in particular via the activation differences, and the pruning is restricted to selected layers of the neural network. As a result, layers used for feature extraction, for example, may be excluded from the pruning. As such, pruning may be reserved for particular subtasks, above all in the case of neural networks which perform various tasks (multi-task learning) or whose task fulfillment is broken down into various sub steps. An example of this is region proposal networks, which identify image sections that are initially relevant for object recognition and then classify and assess said image sections. In this connection, it may be expedient to focus the pruning on classification in order to prevent relevant image regions from being overlooked as a result of the pruning.

In some embodiments, the neural network is retrained after pruning. As a result, a functional quality of the pruned or compressed neural network may be improved. However, this does not have to involve complete training. Instead, the pruned or compressed neural network may be retrained with only a portion of the training data originally used for the training. The retraining in particular takes place by means of the central server.

In some embodiments, the elements are deactivated for pruning at least temporarily. For this purpose, parameters of the element to be pruned are, for example, set to zero, such that the element in the neural network no longer influences a result in the subsequent layer or output layer of the neural network. This has the benefit that the deactivation is easier to reverse compared to removal of an element of the neural network. As such, if, for example, it turns out that a functional quality of the neural network is impaired too much after an element has been deactivated, said element may be reactivated. In particular, the reactivated element may subsequently be marked such that it is not deactivated and/or pruned again during subsequent runs of the method. In the other case, the deactivated element may be removed in a later step, i.e., a structure of the neural network is adapted. This is done, in particular, if a functional quality or other target variables are achieved in spite of the deactivated element.

In some embodiments, it is provided for the pruning to only take place if at least one trigger criterion is met. As a result, the pruning may always take place if a particular state is achieved. In particular, a constant or frequent pruning and/or a selection of the elements of the neural network to be pruned that varies too strongly may be prevented as a result. The trigger criterion may, for example, be a predefined number of elements in the ranking. Furthermore, the trigger criterion may additionally or alternatively be a convergence of the ranking. In this case, "convergence of the ranking" means that the elements in the determined ranking no longer change over a predefined number of runs of the method or a predefined period of time at least for a predefined number of ranks. The presence of the trigger criterion is checked, in particular, by means of the central server.

In some embodiments, the pruned neural network is subsequently transmitted to at least one member of the fleet. This takes place, for example, in the form of a digital data packet that is transmitted via the communication interfaces and that comprises a structure and weightings as well as parameters of the pruned neural network. The members of the fleet receive the pruned neural network and may then replace the neural network stored in a respective memory apparatus with the received pruned neural network. Subsequently, the method may be carried out again on the pruned neural network.

In some embodiments, the determination of the ranking is designed as an iterative process. In this case, the transmission and merging (or aggregation step) on the central server is followed by a redistribution of the ranking, for example as a table, to the members of the vehicle fleet. The members of the fleet then continue or update the ranking until a relevant deviation from the previously distributed ranking occurs and the next aggregation step is triggered. This process ends when the ranking does not change or when the ranking only changes marginally.

Other features of the embodiment of the member of the fleet and of the central server as well as of the system will become apparent from the description of further embodiments of the method. The benefits of the member of the fleet and of the central server as well as of the system are in each case the same as in the embodiments of the method.

In the following, the invention is explained in greater detail based on further exemplary embodiments and with reference to the drawings.

Specific references to components, process steps, and other elements are not intended to be limiting. Further, it is understood that like parts bear the same or similar reference numerals when referring to alternate FIGS.

FIG. 1 is a schematic representation of an embodiment of the system 1. The system 1 comprises multiple members 2 of a fleet in the form of motor vehicles 50 as well as a central server 20.

Each member 2 of the fleet comprises a computing apparatus 3, a memory apparatus 4, and a communication interface 5. Furthermore, each member 2 of the fleet comprises a sensor system 6, for example in the form of a camera 51, which provides camera data as input data 7 via an input interface 8, which data are fed from the input interface 8 to the computing apparatus 3. A neural network 9, i.e. a structure, weightings, and parameters that uniquely describe the neural network 9, is stored in each memory apparatus 4. The computing apparatus 3 may perform computing operations in the memory apparatus 4 and, in particular, operates the neural network 9.

The central server 20 comprises a computing apparatus 21, a memory apparatus 22, and a communication interface 23.

The computing apparatus 3 of the members 2 of the fleet is designed to locally execute the neural network 9 stored in the memory apparatus 4 on the input data 7 and during at least one inference phase each determine a selection 10 of elements of the neural network 9 that should be pruned in each case. Once the selection has been made, the computing apparatus 3 transmits the determined selection 10 via the communication interface 5 to a central server 20.

The computing apparatus 21 of the central server 20 is designed to receive selections 10 of elements of the neural network 9 transmitted by the respective members 2 of the fleet via the communication interfaces 5, 23, to merge said selections, and to generate a merged selection 11. The neural network 9 is subsequently pruned by the computing apparatus 21 on the basis of the merged selection 11, such that a pruned neural network 12 is generated.

The pruned neural network 12 may then be transmitted to the members of the fleet via the communication interfaces 5, 23. The computing apparatuses 3 of the members 2 of the fleet may then replace the neural network 9 in the memory apparatus 4 with the pruned neural network 12.

It may be provided that the selections 10 be transmitted to the central server 20 if at least one transmission criterion 13 is met. A transmission criterion 13 may, for example, be a specific number of locally collected or selected elements of the neural network 9. A transmission criterion 13 may also require that a selection no longer change after multiple local runs or inference phases.

It is possible for the members 2 of the fleet to each produce a ranking 14 of the selected elements and for the selection 10 to be transmitted to the central server 20 in the form of the produced ranking 14, wherein the central server 20 produces a merged ranking 15 on the basis of the transmitted rankings 14 in order to carry out the merging. The neural network 9 is then pruned on the basis of the merged ranking 15.

It is possible for the neural network 9 to be fed input data 7 that vary with time in order to determine the respective selection in each case, wherein temporal activation differences of elements of the neural network 9 are determined for temporally adjacent input data 7, and wherein the elements of the neural network 9 are selected depending on the determined temporal activation differences. In particular, for the selection, a ranking 14 of the elements of the neural network 9 may be produced on the basis of the respective temporal activation differences determined for the elements. The selection 10 then comprises the ranking 14 produced in this manner.

It is possible for the neural network 9 to be retrained in the central server 2 after pruning.

It is possible for the elements to be deactivated for pruning at least temporarily. For this purpose, parameters of the element are, for example, set to zero, such that the element in the neural network 9 no longer influences a result in the subsequent layer or output layer of the neural network 9. As such, if, for example, it turns out that a functional quality of the neural network 9 is impaired too much after an element has been deactivated, said element may be reactivated. In particular, the reactivated element may subsequently be marked such that it is not deactivated and/or pruned again during subsequent runs of the method. In a later step, in particular after the neural network 9 has been retrained, the deactivated element may be removed, i.e. a structure of the neural network 9 is adapted such that the pruned neural network 12 is generated. This is done, in particular, if a functional quality or other target variables are achieved in spite of the deactivated element.

Furthermore, it is possible for the pruning to only take place if at least one trigger criterion 30 is met. The trigger criterion 30 may, for example, consist in a predefined number of elements in the merged ranking 15 being reached. Furthermore, the trigger criterion 30 may additionally or alternatively be a convergence of the merged ranking 15. In this case, "convergence of the merged ranking 15" means that the elements in the merged ranking 15 no longer change over a predefined number of runs of the method or a predefined period of time at least for a predefined number of ranks. The presence of the trigger criterion 30 is checked, in particular, by means of the central server 20.

Figure 2:
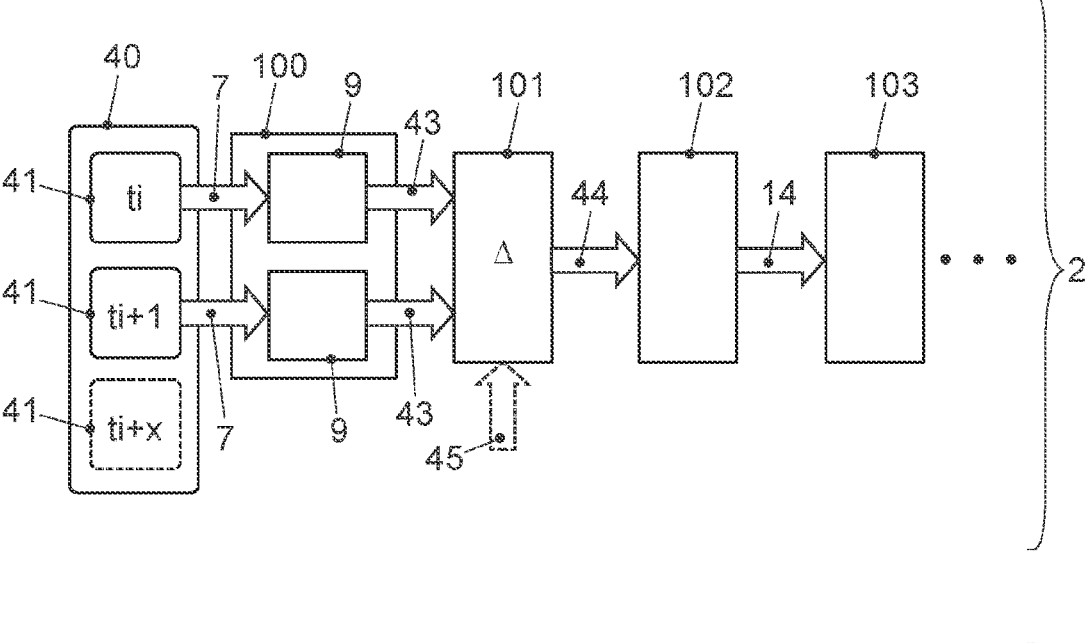
FIG. 2 is a schematic flow diagram of an embodiment of a method for compressing a neural network.
Figure 2:
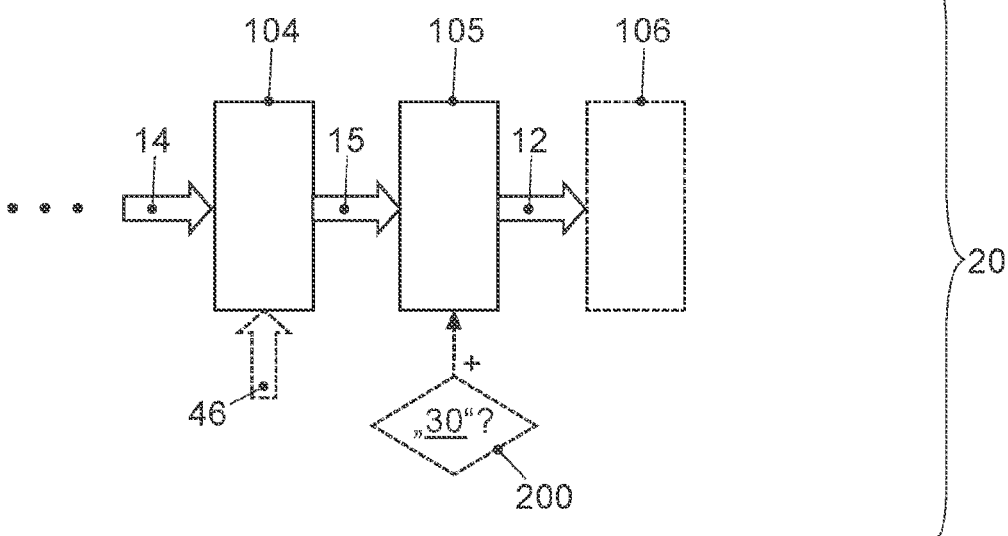

FIG. 2 is a schematic flow diagram for illustrating an embodiment of the method for compressing a neural network 9. The method is carried out by means of a system 1 that is designed in the same way as the embodiment shown in FIG. 1, for example. Part of the method is carried out in each of the members 2 of the fleet, and another part in the central server 20. The flow diagram is explained based on the example of input data 7 that are provided in the form of a video 40 consisting of video frames 41. The video frames 41 each correspond to a point in time $t_i$.

In a method step 100, the video frames 41 are fed to the neural network 9. This is shown for two adjacent time increments, i.e. for a video frame 41 that corresponds to the point in time $t_i$ and for a video frame 41 that corresponds to the following point in time $t_{i+1}$. The neural network 9 is applied to the video frames 41 and infers a result at outputs of an output layer of the neural network 9. The result may, for example, comprise object recognition or classification and/or the creation of bounding boxes for the recognized objects. During the inference, values for activations 43 of elements of the neural network 9 are acquired or read out. If the neural network 9 is designed as a convolutional neural network, the activations 43 correspond to the respective values at outputs of filters of the convolutional neural network. By way of example, the result is in each case provided as a list, in which the activation 43 associated with each element of the neural network 9 is stored for the points in time $t_i$ and $t_{i+1}$ in question.

In a method step 101, a temporal activation difference 44 is determined for the two points in time $t_i$ and $t_{i+1}$ in question from the values for the activations 43 of the individual elements. This is done element by element for all elements of the neural network 9. In particular, an amount of a difference between the values of the activation 43 of the individual elements is considered. Subsequently, a temporal activation difference 44 in relation to the two points in time $t_i$ and $t_{i+1}$ is available for each of the elements of the neural network 9. The result is provided, for example, as a list, in which the temporal activation difference 44 for each element of the neural network 9 is stored for the points in time $t_i$ and $t_{i+1}$ in question.

It is possible for the temporal activation differences 44 to be averaged and for the subsequent method steps 102-106 to be carried out proceeding from the averaged activation differences 44.

It is possible for at least some of the determined activation differences 44 to be determined depending on at least one influencing parameter 45. For example, a speed (provided, e.g., by a GPS sensor), current weather (provided, e.g., by a rain sensor), and/or a steering angle (provided, e.g., by a steering angle sensor) may be used to amplify or attenuate a determined activation difference 44 depending on the situation.

In a method step 102, the determined temporal activation differences 44 are sorted according to size. This produces a ranking 14 in which the elements of the neural network 9 with the largest temporal activation differences 44 occupy the upper ranks.

In a method step 103, the produced rankings 14 are transmitted by the members 2 of the fleet via communication interfaces to the central server 20.

In the central server 20, in a method step 104, a merged ranking 15 is generated on the basis of the transmitted rankings 14. The merging, which may also be referred to as aggregation, may in particular comprise the formation of an arithmetic average value, geometric averaging methods (e.g. centroids of vectors formed from the individual rankings 14 may be formed), moment-based averaging methods, swarm-based averaging methods, geographic averaging methods, and/or safety-focused averaging methods.

It is possible for the merged ranking 15 to be produced taking into account at least one target variable 46. The at least one target variable 46 may, for example, relate to a robustness of the neural network 9. Moreover, elements or filters that have a greater influence within the neural network 9 may be retained in spite of a large temporal activation difference 44. Furthermore, elements or filters that resemble a functionality according to other elements or filters (e.g. filters that filter camera data by way of a convolution with a filter function) may be shifted further up in the merged ranking 15, i.e. they may take preference during pruning or removal. Conversely, elements or filters that do not resemble other elements or filters may be shifted further down in the merged ranking 15, i.e. less preferentially deleted. Other target variables 46 may be plurality-oriented, i.e. ensure that many different features are recognized or filtered out in the input data 7. Accordingly, a merged ranking 15 may be adapted in such a way that many different features or a minimum number of different features are recognized or filtered out. Another target variable 46 may also be a performance of the neural network 9.

It is possible for the elements to be deactivated for pruning at least temporarily. In a subsequent method step, for example after successful retraining, the neural network 9 may then be pruned.

In a method step 105, the neural network 9 is pruned in that elements of the neural network 9 with the largest temporal activation differences 44 according to the merged ranking 15 are removed from the structure of the neural network 9. As a result, a pruned neural network 12 is provided.

It is possible, in a method step 200, to carry out a preliminary check as to whether at least one trigger criterion 30 is met. The neural network 9 is only pruned if the trigger criterion 30 is met.

In a method step 106, the pruned neural network 12 may be retrained in order to increase a functional quality of the pruned neural network 12.

The method steps 100-106 described are carried out for additional points in time $t_{i+x}$. It is in particular provided for the pruning to be carried out in method step 105 on the basis of an merged ranking 15 that was produced for average values of the temporal activation differences 44. In this connection, an average is in particular formed over multiple points in time $t_i$.

In particular, the method steps 100-106 are repeated cyclically, wherein current input data 7 are used in each case. In particular, the method steps 100-106 are repeated using the (retrained) pruned neural network 12, wherein the neural network 9 is exchanged for the respective (retrained) pruned neural network 12 for this purpose.

The neural network 9 may be compressed by means of the above-described embodiment of the method, wherein a stability of the neural network 9 increases at the same time, since unstable elements of the neural network 9 are removed or deactivated.

In the following, the determination of a ranking proceeding from temporal activation differences will be explained with the aid of a mathematical example. It is assumed that the input data consist of a video sequence consisting of video frames. Depending on the number of video frames per unit of time (e.g. per second), there are only minor changes in adjacent video frames. The method takes benefit of this and uses it to prune the neural network based on stability. The method is applied, in particular, to a well trained neural network, in particular a convolutional neural network (CNN). Filters of the CNN, in particular, are considered as elements of the neural network. In this connection, filters (also referred to as filter kernels) whose activations exhibit a significant change in the activation (i.e. for which a temporal activation difference is large) for adjacent video frames, i.e. for input data that vary with time, are considered unstable. In the embodiment of the method, filters of this kind are placed higher in a ranking. Only unmarked (unlabeled) input data are required as input data, for example video frames of a video sequence detected by means of a camera for detecting the surroundings of a motor vehicle.

A (convolutional) layer in particular comprises multiple filters (also referred to as filter kernels), wherein each filter in particular receives an entire output of a preceding layer and each filter provides an associated feature map as the output.

For a video frame in a sequential data set (video sequence) with a height H, a width W, channels C, and a point in time t, with $t \in \mathbb{N} : [1 \ldots T]$, $x_t \in G^{H \times W \times C}$ is defined as a video frame of a data set x, wherein $G = \{0 \le z \le 255 | z \in \mathbb{N} \, N\}$. The video frame $x_t$ is the input (i.e. corresponds to the input data at the input) of a neural network $\Im (\bullet, \theta)$, wherein $\theta$ are parameters of the neural network. Said neural network $\Im (\bullet, \theta)$ comprises $L \in \mathbb{N}$ (convolutional) layers, the outputs of which are $\Psi_l(\bullet) \in \mathbb{R}^{H_l \times W_l \times k_l}$, with a height $H_l$, a width $W_l$, and a number of feature maps $k_l$ for $l \in \{1, \ldots, L\}$.

$\Psi_{l,j}$ denotes the jth feature map of the output of the layer l, i.e. the feature map pertaining to the filter j of the layer l, wherein $j \in \{1, \ldots, k_l\}$. $\mathcal{F}_t = \{\Psi_{l,j}\} \forall l = \{1, \ldots, L\}$, $j = \{1, \ldots, k_l\}$ may then be defined as a set of all feature maps in the neural network at a point in time t.

A stability is in particular defined as a change in the output $\Psi_{l,j}$ (activation difference) in relation to a change in the associated input $x_t$, i.e. a ranking function rank results for a filter j in the layer l and for a point in time t:

$$\text{rank}(l, j, t) = \left| \frac{\partial \Psi_{l,j}(x_t)}{\partial x_t} \right| \tag{1}$$

with $$| \cdot | : \mathbb{R}^{H_l \times W_l} \to \mathbb{R}_{\ge 0}$$

In simple terms, an instability is greater the higher a resulting value of the ranking function for a particular filter. The ranking function is in particular determined for each element of the neural network, in the present example for each filter.

The changes in the outputs $\Psi_{l,j}(x_t)$, i.e. in the activations of the filters, may be caused by two things. Firstly, a change at the output may be brought about by a change in the video frame $x_t$ at the input. Secondly, a change may also be brought about by a change in the activations at the output of a preceding layer $\psi_{l-1}(x_t)$.

The structural similarity index measure (SSIM), which is known per se, may for example be used to calculate a difference between successive video frames (i.e. temporally adjacent input data). The SSIM is used to measure a similarity between two images.

$$\Delta x_t = 1 - SSIM(x_t, x_{t-1}) \tag{2}$$

Since the stability of $\Psi_{l,j}$ also depends on a stability of the outputs (activations) of $\psi_{l-1}$, a filter in the layer l should be prevented from being pruned on account of an instability in the layer l−1. Therefore, the contribution of the preceding layer is taken into account in the ranking function. $\mathcal{D}_{l,t}$ is the normalized output of the lth layer to the subsequent layer at the point in time t. This is calculated in the following equation. In order to be able to compare the changes in the outputs (activations) of the filters in the entire neural network, the outputs (activations) are normalized with a height $H_l$, a width $W_l$, and a number $k_l$ of channels (feature maps) of the layer l.

$$\mathcal{D}_{l,t} = \left| \frac{\psi_l(x_t) - \psi_l(x_{t-1})}{H_l \times W_l \times k_l} \right| \tag{3}$$

The equations (2) and (3) are combined with the equation (1) in order to calculate the stability-based rank for each filter. The rank is defined here as $$R_{l,j}^a,$$

wherein $a \in \mathbb{N} [1, \ldots, A]$ is a video sequence. Equation (4) defines the rank as a (temporal) activation difference, averaged over all points in time t (i.e. over a number T of video frames), with respect to a change at the inputs of the filters, i.e. with respect to a (temporal) change of the input data:

$$R_{l,j}^a = \sum_{t=1}^{T} \frac{1}{T} \left| \frac{\Psi_{l,j}(x_t) - \Psi_{l,j}(x_{t-1})}{\Delta x_t + \lambda (\mathcal{D}_{l-1,t} \times H_l \times W_l)} \right| \tag{4}$$

$\lambda$ is a weighting factor that may be used to set an influence of the preceding layer. In this connection, the influence of the preceding layer is weighted with a size $H_l \times W_l$ of the respective layer l in question.

Average values are determined from this, i.e. the rank $$R_{l,j}^a$$

is summed over multiple unmarked (unlabeled) video sequences A and averaged (arithmetically), as shown in equation (5).

$$R_{l,j} = \frac{1}{A} \sum_{a=1}^{A} R_{l,j}^a \tag{5}$$

Larger values of $R_{l,j}$ in each case indicate greater instability of the filter in question (jth filter in the lth layer). It is possible to use other methods for the averaging, e.g. moment-based averaging methods or averaging methods in which individual activation differences are each taken into account on a weighted basis.

The ranking produced in this manner is transmitted to the central server, where the transmitted ranking is merged with transmitted rankings of other members of the fleet.

Subsequently, the neural network is pruned on the basis of the merged ranking, for example the filters in the upper (5, 10, 20, etc.) ranks of the merged ranking are removed from the neural network, since these are the most unstable filters or elements of the neural network.

The mathematical example is based on a video sequence or video frames as input data. However, in principle, the procedure is the same for any other type of input data.

LIST OF REFERENCE NUMERALS

1 System
2 Member of a fleet
3 Computing apparatus (member of the fleet)
4 Memory apparatus (member of the fleet)
5 Communication interface (member of the fleet)
6 Sensor system
7 Input data
8 Input interface
9 Neural network
10 Selection
11 Merged selection
12 Pruned neural network
13 Transmission criterion
14 Ranking
15 Merged ranking
20 Central server
21 Computing apparatus (central server)
22 Memory apparatus (central server)
23 Communication interface (central server)
30 Trigger criterion
40 Video
41 Video frame
43 Activation
44 Temporal activation difference
45 Influencing parameter
46 Target variable
50 Motor vehicle
100-106 Method steps
200 Method step
$t_i$ Point in time
$t_{i+1}$ Point in time
$t_{i+x}$ Additional point in time The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for compressing a neural network, comprising:
executing the neural network by a plurality of member vehicles of a vehicle fleet, wherein each member vehicle comprises a local memory and the vehicle processor, wherein the local memory stores the neural network and the vehicle processor executes the neural network locally;

determining, during at least one inference phase by the member vehicles, a selection of elements of the neural network that should be pruned, wherein determining the selection of elements comprises:
feeding the neural network temporally adjacent input data;
calculating temporal activation differences for elements of the neural network, wherein a temporal activation difference for an element represents a change in output activation of the element between the temporally adjacent input data;
ranking the elements according to their respective temporal differences; and
selecting the elements having temporal activation differences exceeding a predefined threshold value;
transmitting, by the member vehicles of the fleet, the respectively determined selection to a central server;
transmitting, by the member vehicles of the fleet, rankings of the selection of elements;
providing, by the central server, a merged ranking on the basis of the transmitted rankings;
merging, by the central server, the respectively transmitted selections and generating a merged selection on the basis of the merged ranking;
pruning, by the central server, the neural network on the basis of the merged selection, wherein elements most frequently selected by the member vehicles of the vehicle fleet are pruned;
transmitting, by the central server, the pruned neural network to at least one member vehicle of the vehicle fleet;
storing, by the at least one member vehicle of the vehicle fleet, the pruned neural network in the local memory of the member vehicle, which pruned neural network replaces the neural network in the local memory; and
using the pruned neural network in one or more of a driver assistance system and a driving function for automated driving of the respective at least one member vehicle.

2. The method of claim 1, wherein the selection is transmitted to the central server if at least one transmission criterion is met.

3. The method of claim 2, comprising retraining the neural network after the pruning.

4. The method of claim 2, comprising deactivating the elements for pruning at least temporarily.

5. The method of claim 1, comprising retraining the neural network after the pruning.

6. The method of claim 1, comprising deactivating the elements for pruning at least temporarily.

7. The method of claim 1, wherein the pruning only takes place if at least one trigger criterion is met.

8. A system for compressing neural network, comprising:
a plurality of member vehicles of a vehicle fleet and a central server;
wherein each member vehicle comprises:
a local memory; and
a vehicle processor;
wherein the vehicle processor is configured to:
execute the neural network stored in the local memory;
determine, during at least one inference phase, a selection of elements of the neural network that should be pruned, wherein determining the selection of elements comprises:
feeding the neural network temporally adjacent input data;

calculating temporal activation differences for elements of the neural network, wherein a temporal activation difference for an element represents a change in output activation of the element between the temporally adjacent input data;

ranking the elements according to their respective temporal differences; and selecting the elements having temporal activation differences exceeding a predefined threshold value;

transmit the determined selection to the central server;

transmit rankings associated with the selected elements to the central server;

receive, from the central server, a pruned neural network;

store the pruned neural network in the local memory of the member vehicle, wherein pruned neural network replaces the neural network in the local memory; and provide the pruned neural network to one or more of a driver assistance system and a driving function for automated driving of the member vehicle;

wherein the central server comprises:

a processor and a memory;

wherein the memory comprises computer instructions that causes the processor to:

receive selections of elements of the neural network from the plurality of member vehicles of a vehicle fleet;

receive rankings of the selection of elements from the plurality of member vehicles of the vehicle fleet;

provide a merged ranking on the basis of the received rankings;

merge selections of elements of the-a neural network transmitted by the member vehicles of the vehicle fleet on the basis of the merged ranking;

generate a merged selection;

prune the neural network on the basis of the merged selection, wherein the elements that are most frequently selected by the member vehicles of the vehicle fleet are pruned; and transmit the pruned neural network to at least one member vehicle of the vehicle fleet.

* * * * *